United States Patent [19]
Atwood et al.

[11] Patent Number: 5,417,989
[45] Date of Patent: May 23, 1995

[54] METHOD FOR MAKING BIALYS

[75] Inventors: Harold Atwood; Thomas A. Atwood, both of Dolton, Ill.

[73] Assignee: AM Manufacturing Company, Dolton, Ill.

[21] Appl. No.: 278,577

[22] Filed: Jul. 21, 1994

Related U.S. Application Data

[63] Continuation of Ser. No. 932,671, Aug. 20, 1992, abandoned, which is a continuation-in-part of Ser. No. 873,338, Apr. 20, 1992, abandoned, which is a continuation of Ser. No. 584,054, Sep. 18, 1990, abandoned.

[51] Int. Cl.$^6$ .............................................. A21D 8/02
[52] U.S. Cl. ..................................... 426/27; 426/496; 426/279; 426/280
[58] Field of Search ................... 426/27, 496, 279–280

[56] References Cited
U.S. PATENT DOCUMENTS

| | | |
|---|---|---|
| 2,774,310 | 12/1956 | Daino . |
| 3,347,181 | 10/1967 | Pizzo . |
| 3,819,837 | 6/1974 | Keith et al. . |
| 3,845,219 | 10/1974 | Federico . |
| 3,949,660 | 4/1976 | Kuhlman ........................ 426/427 X |
| 4,303,677 | 12/1981 | DeAcetis . |
| 4,417,867 | 11/1983 | Bauer . |
| 4,511,324 | 4/1985 | Bauer . |
| 4,645,673 | 2/1987 | Wilmes ................................ 426/94 |

*Primary Examiner*—Joseph Golian
*Attorney, Agent, or Firm*—Hill, Steadman & Simpson

[57] ABSTRACT

Applicants have devised a new and improved method of making bialys that reduces the cost of production by eliminating the relatively expensive step of shaping each piece of dough manually and also insures greater uniformity in the shape of the bialys. After each piece of dough is relaxed by first proofing, it is positioned under a heated die that is shaped to press the dough into a form which becomes the basis of the bialy shape, with a flat, relatively dense center portion completely surrounded by a softer outer rim portion. The heat and pressure applied to the flat center portion of the bialy kills all the yeast cells in that portion of the bialy, while permitting yeast growth to continue within the outer rim portion. The density of the flat center portion becomes sufficient to prevent the outer rim from shrinking back on to the center, as the outer rim expands due to the induced growth from the yeast. Holes are punctured in the center portion of the docking pins formed on the die to permit steam and other gases to be released from the center portion during second proofing and bake off. Any suitable condiments, such as meat, cheese or sauce, may be placed on the flat center portion of the bialy, which is then proofed a second time before it is placed in a hot oven for bake off.

12 Claims, 1 Drawing Sheet

METHOD FOR MAKING BIALYS

RELATED APPLICATIONS

This is a continuation of application Ser. No. 932,671, filed Aug. 20, 1992, now abandoned, which is a continuation-in-part of U.S. Ser. No. 07/873,338, filed Apr. 20, 1992, now abandoned, which is a continuation of U.S. Ser. No. 07/584,054, filed Sep. 18, 1990, now abandoned.

BACKGROUND OF THE INVENTION

In the past bialys have never attained a popularity similar to the popularity of bagels because of the expense of making a bialy compared to the expense of making a bagel. The reason for the price differential is that the bagel is made by a machine while the bialy has heretofore always required a manual shaping operation. The bialy requires a flat, relatively dense, center portion completely surrounded by an upstanding outer rim portion of softer dough. Applicants have devised an apparatus and a method for forming dough into the bialy shape automatically, by subjecting the dough to heat and to different degrees of pressure across the surface of the dough piece to produce the required flat relatively thin dense center portion and the softer outer rim portion completely surrounding the center portion. The new method of making bialys eliminates the costly manual shaping operation heretofore deemed necessary in the commercial production of bialys.

In addition to the increased speed of production inherent in the elimination of the step of manually shaping the bialy, the improved method also disclosed herein produces a more uniform product because each bialy has exactly the same shape and the same texture as every other bialy.

SUMMARY OF THE INVENTION

The present invention is directed to a method of shaping a bialy from a piece of dough, after the dough is subjected to a first proofing, by heating and pressing the dough, with different degrees of pressure applied to different areas of the dough simultaneously to form a relatively flat dense center portion completely surrounded by a softer outer rim. The formed dough piece is then subjected to a second proofing before bake off.

A novel apparatus in the form of a heated die having a specially formed contour and docking pins allows for the automatic formation of the bialy shape from an unformed ball of dough. Air release openings in the die assist in the removal of the die from the dough shape after the forming step.

DETAILED DESCRIPTION OF THE PREFERRED EMBODIMENTS

Figure 1:
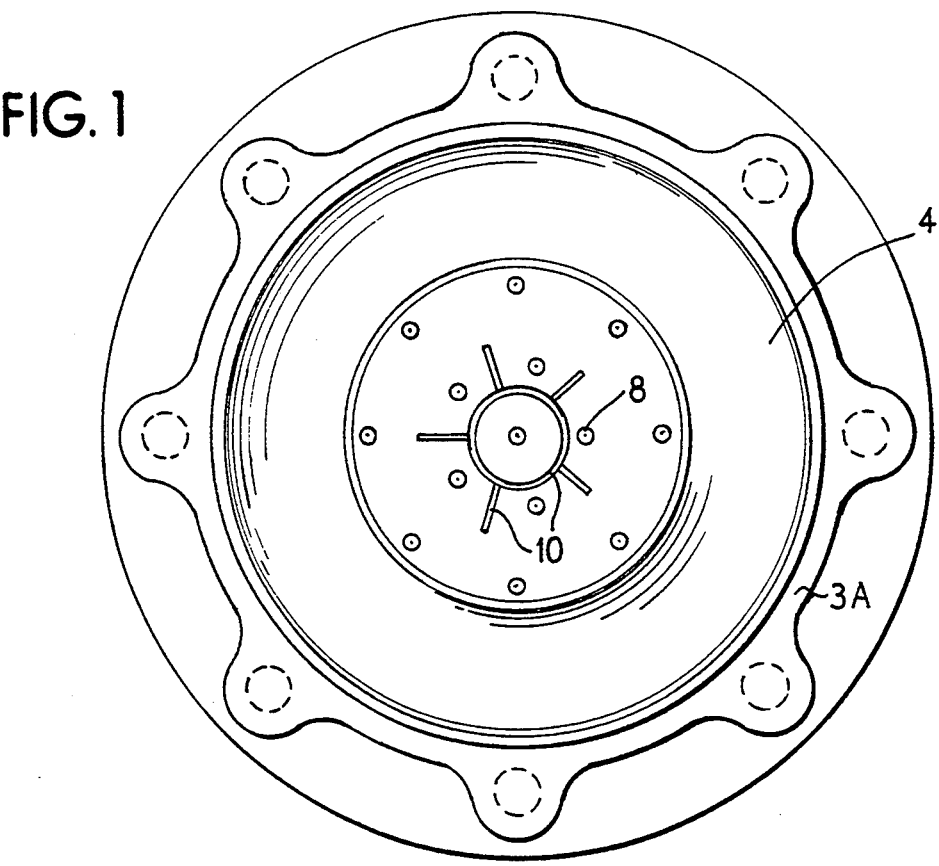
FIG. 1 is a bottom view of the die used to form the bialy.
Figure 2:
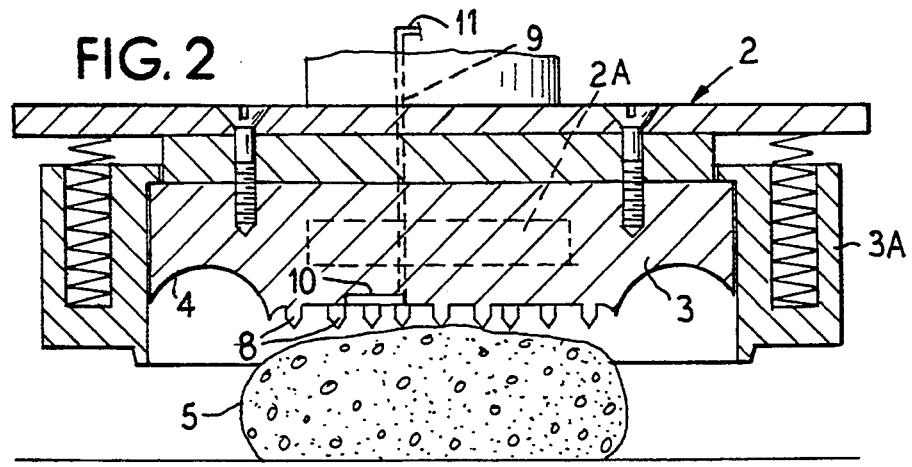
FIG. 2 is a diagrammatical view showing a piece of dough as it is first engaged by the heated die that is shaped to impart the desired shape to the dough.
Figure 3:
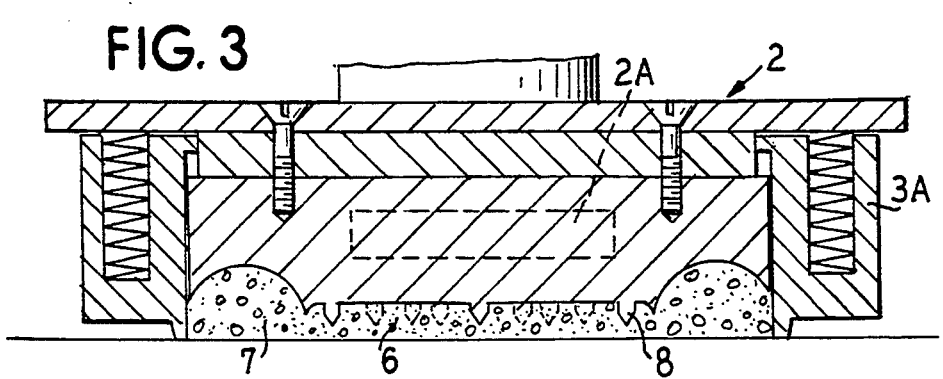
FIG. 3 is a diagrammatical view showing the heated die in its final position in which the dough has been pressed into the shape of a bialy.

After a quantity of dough is mixed in accordance with any suitable recipe, it is divided into individual pieces of the desired size which are then subjected to a first proofing. As the individual pieces of dough are discharged from the first proofing, each piece of dough is engaged by a die 2 having an internal heating element 2A. The die has a center portion 3 surrounded by a circular recess 4 having a depth equal to the height desired for the outer rim portion of the bialy. Docking pins 8 extend downwardly from the center portion 3 of the die to provide perforations in the flat center portion 6 of the dough. The perforations allow for the release of steam and gases from the center portion 6 of the formed dough during the second proofing stage or during bake off. Without such perforations, the center portion 6 tends to expand, thus destroying the flat compressed configuration of the center portion.

In a preferred embodiment, the die has an air passage 9 formed therethrough and a configured channel 10 is formed in the bottom face of the die center portion 3. The air passage 9 is connected to a conduit 11 leading to a controllable supply of air under pressure. As the die 2 begins to lift away from the surface supporting the dough, a blast of air is supplied to the air passage 9 which flows out the channel into engagement with the dough to separate the dough from the die. Thus, any tendency of the dough to stick to the die is overcome and it is assured that the compressed center portion 6 will not be pulled away from its compressed portion by the upward movement of the die. The die 2 is reciprocated vertically by any suitable mechanism and applies heat and pressure to each piece of dough 5 after the dough is relaxed by the first proofing. No specific mechanism for reciprocating the die is described because such mechanism does not constitute part of the present invention. The shape of the die causes the dough to be pressed into the shape of a bialy as the die is moved downwardly against the dough.

As the heated die is pressed downwardly against the dough it forms a flat center portion 6 that is very dense and is completely surrounded by an outer rim portion 7 that has room to expand into the recess 4. The heat and pressure exerted by the die against the flat center portion of the bialy is sufficient to destroy all the yeast cells within the center portion, thereby inhibiting any yeast activity within the flat center portion of the bialy, while allowing the yeast activity within the outer rim portion of the bialy to cause continued growth in the outer rim portion. The density of the flat center portion of the bialy is sufficient to prevent the outer rim portion of the bialy from shrinking back into the center portion as the yeast activity within the outer rim portion causes said outer rim portion to expand into the circular recess in the die.

The dense center portion of the bialy forms a firm base capable of holding various condiments, such as meat, cheese, or sauce, which may be placed thereon prior to the bake off.

An outer ring 3A surrounds the center portion 3 of the die to provide an outside boundary for the bialy. The outer ring 3A is spring biased downwardly so it will be the first to engage to the surface supporting the unformed dough. As the die 2 continues to move downwardly, the center portion 3 slides downwardly relative to the outer ring 3A to form the bialy.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim as our invention:

1. The process of making a bialy comprising the steps:
subjecting a piece of dough to a first proofing,
placing said piece of dough on a support surface,
providing a die having a radially outer portion and a heated central portion of said die which is vertically movable relative to said radially outer portion, said central portion having an annular recessed area at a peripheral edge thereof adjacent to said radially outer portion,
surrounding said piece of dough with said radially outer portion of a die by placing said outer portion in engagement with said surface to provide an outside boundary for said bialy,
subsequently moving said central portion of said die downwardly relative to said surface and said radially outer portion to apply heat and pressure from said die central portion to a top side of said piece of dough to deform said piece of dough into a bialy shape having a relatively thin flat center dough portion and a raised outer rim portion,
pressing said central portion against said dough piece so as to prevent further expansion of said center portion, while shaping an outer rim portion at said annular recessed area without compressing said outer rim portion, so as to allow said outer rim portion surrounding the flat center portion to expand by continued normal yeast activity in the outer rim portion, and
subsequently subjecting the dough to a second proofing.

2. The process as recited in claim 1, in which the temperature and pressure applied to the center portion of the dough after the first proofing is sufficient to inhibit any subsequent yeast activity in said center portion.

3. The process as recited in claim 1, in which the temperature and pressure applied to the center portion of the bialy makes the center portion so dense that the subsequent growth of the outer rim portion cannot cause the outer rim portion to shrink back on to the center portion.

4. The process as recited in claim 1, in which the temperature and pressure applied to the center portion of the bialy after the first proofing kills the yeast cells in said center portion and prevents any yeast action in said center portion, while allowing normal yeast activity in said outer rim portion.

5. The process according to claim 1, further including separating said die from said dough by introducing air between said die and said dough after said dough has been compressed by said die.

6. The process as recited in claim 1, including the step of impressing puncture holes in said flat center portion with said die.

7. The process of making a bialy comprising the steps:
subjecting a piece of dough to a first proofing,
placing said piece of dough on a support surface,
providing a die having a radially outer portion and a heated central portion of said die which is vertically movable relative to said radially outer portion, said central portion having an annular recessed area at a peripheral edge thereof adjacent to said radially outer portion,
surrounding said piece of dough with said radially outer portion of a die by placing said outer portion in engagement with said surface to provide an outside boundary for said bialy,
subsequently moving said central portion of said die downwardly relative to said surface and said radially outer portion to compress a center portion of said piece of dough such that tile temperature and pressure provided by said central portion of said die prevent further expansion of said center portion,
shaping an outer rim portion at said annular recessed area without preventing further expansion of the rim portion, and
subsequently subjecting the dough to a second proofing.

8. The process according to claim 7, further including separating said die from said dough by introducing air between said die and said dough after said dough has been compressed by said die.

9. The process according to claim 7, further including impressing puncture holes in said center portion with said die.

10. The process of making a bialy comprising the steps:
relaxing a piece of dough,
placing said piece of dough on a support surface,
providing a die having a radially outer portion and a heated central portion of said die which is vertically movable relative to said radially outer portion, said central portion having an annular recessed area at a peripheral edge thereof adjacent to said radially outer portion,
surrounding said piece of dough with said radially outer portion of a die by placing said outer portion in engagement with said surface to provide an outside boundary for said bialy,
compressing a center portion of said dough piece with said heated central portion of said die such that the temperature and pressure provided by said die compress said center portion of said dough to a density which prevents further expansion of said center portion,
shaping an outer rim portion with said annular recess by compressing it to a density which permits further expansion of said outer rim portion, and
subsequently permitting further expansion of said outer rim portion to occur.

11. The process according to claim 10, further including separating said die from said dough by introducing air between said die and said dough after said dough has been compressed by said die.

12. The process according to claim 10, further including impressing puncture holes in said flat center portion with said die.

* * * * *